Oct. 19, 1965 S. W. SOOS, JR 3,213,234
MECHANISM COMPRISING VARIABLE-FRICTION DRIVE MEANS
FOR OPERATING CIRCUIT INTERRUPTERS
Filed June 11, 1962 2 Sheets-Sheet 1

WITNESSES
Edwin E. Bassler
James F. Young

INVENTOR
Steven W. Soos, Jr.
BY
William A. Elchik
ATTORNEY

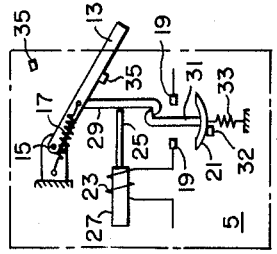
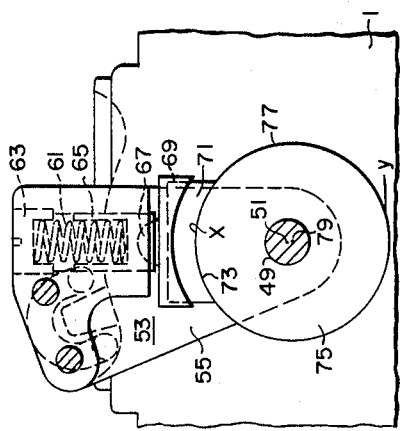
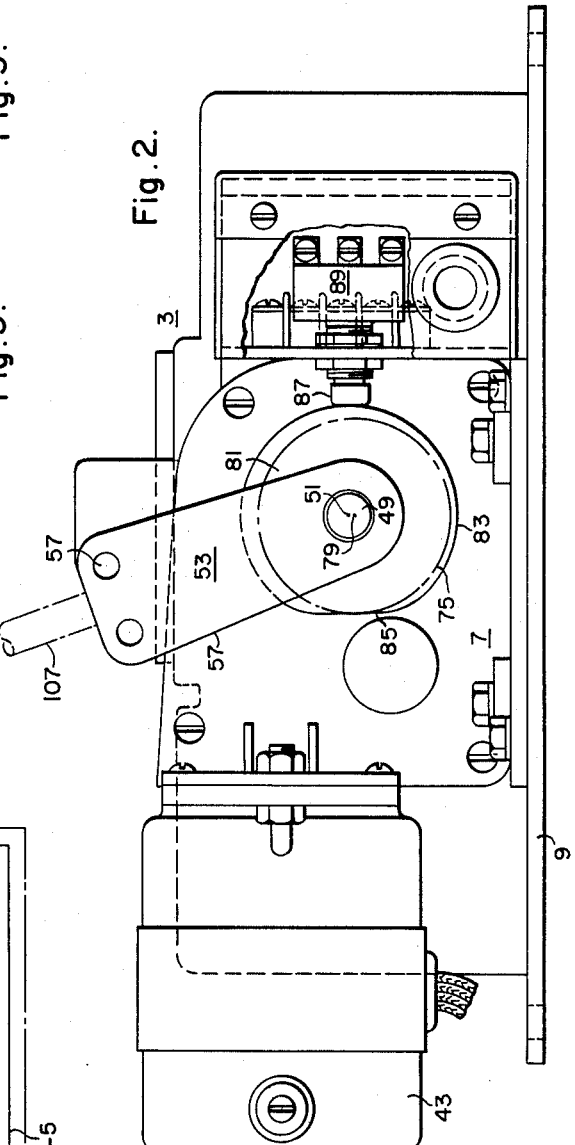
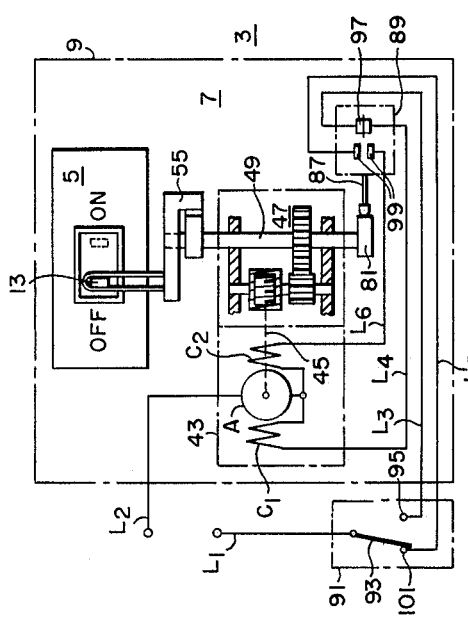

United States Patent Office 3,213,234
Patented Oct. 19, 1965

3,213,234
MECHANISM COMPRISING VARIABLE-FRICTION DRIVE MEANS FOR OPERATING CIRCUIT INTERRUPTERS
Steven W. Soos, Jr., Brecksville, Ohio, assignor to Westinghouse Electric Corporation, East Pittsburgh, Pa., a corporation of Pennsylvania
Filed June 11, 1962, Ser. No. 201,373
10 Claims. (Cl. 200—92)

This invention relates generally to mechanisms for operating circuit interrupters and more particularly to motor operating mechanisms for operating circuit interrupters.

A general object of this invention is to provide an improved mechanism for operating circuit interrupters.

Another object of this invention is to provide an improved variable-friction type motor operating mechanism for operating circuit interrupters.

Another object of this invention is to provide an improved motor operating mechanism that can be connected to actuate the operating member of a circuit interrupter which mechanism comprises a variable-friction type driving means and has means for permitting adjustment of the frictional force characteristics whereby the mechanism can be used to effectively operate various types of circuit interrupters without damaging the operating members of the interrupters.

Another object of this invention is to provide an improved motor operating mechanism for operating a circuit interrupter which mechanism comprises means permitting manual operation of the circuit interrupter without requiring an operation disconnecting the driving means from the driven means.

A further object of this invention is to provide an improved motor operating mechanism with improved means for operating a circuit breaker of the molded-case type without damaging the external operating handle of the circuit breaker.

A further object of this invention is to provide an improved combination comprising a circuit interrupter and a mechanism for operating the circuit interrupter.

The novel features that are considered characteristic of the invention are set forth in particular in the appended claims. The invention itself, however, both as to structure and operation, together with additional objects and advantages thereof, will be best understood from the following detailed description of a preferred embodiment thereof when read in conjunction with the accompanying drawings, in which:

FIG. 2 is a side elevational view taken along the line II—II of FIG. 1;

FIG. 3 is a partial sectional view taken along the line III—III of FIG. 1;

FIG. 4 is a diagrammatic view of the apparatus seen in FIG. 1 illustrating the control circuits for the apparatus; and FIG. 5 is a schematic view of parts of the circuit breaker seen in FIGS. 1 and 4.

Figure 1:
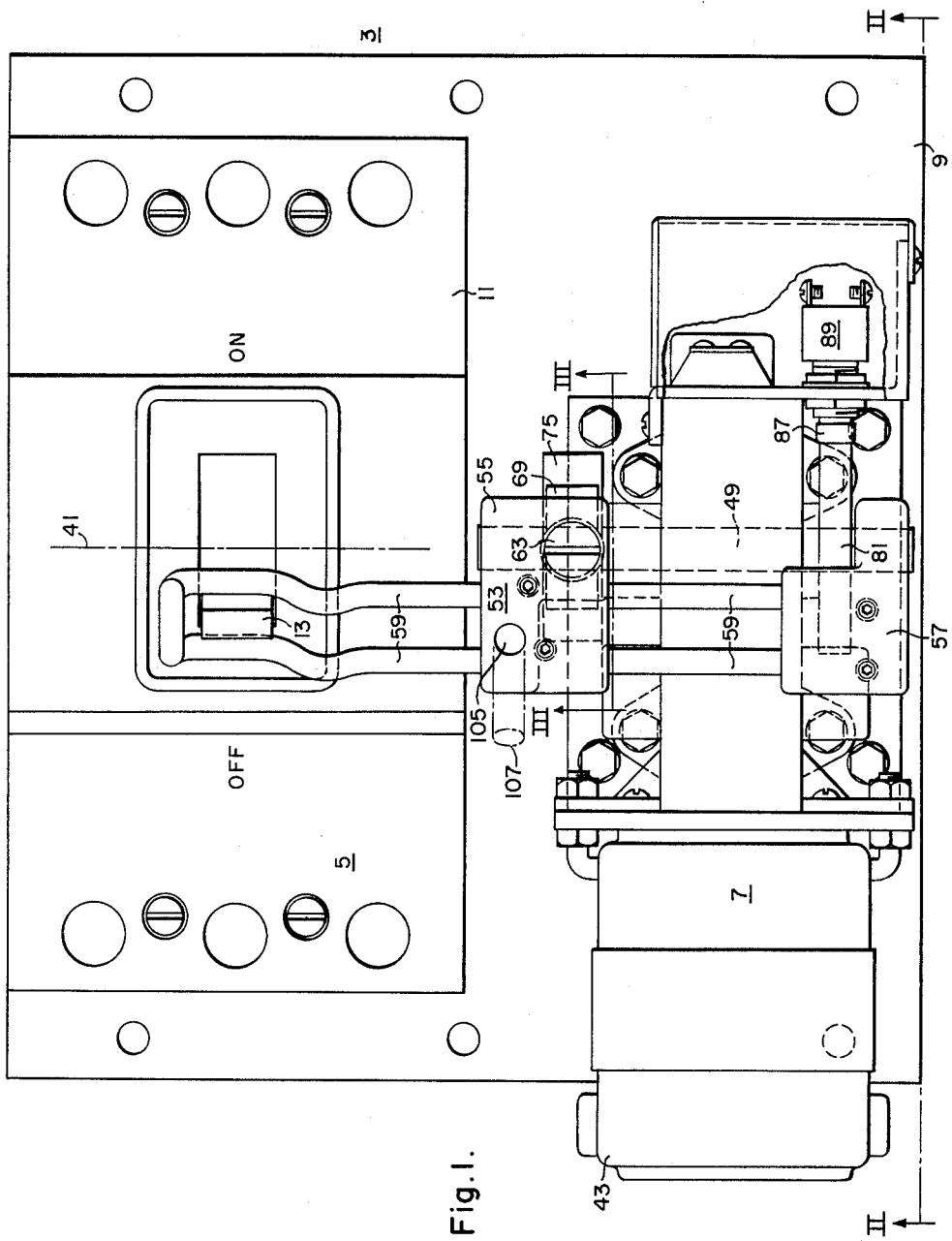
FIGURE 1 is a plan view of a circuit interrupting apparatus constructed in accordance with principles of this invention.

Referring to the drawings and particularly to FIGS. 1 and 2, there is shown therein a circuit interrupting apparatus 3 comprising a circuit breaker 5 and a motor operating mechanism 7, both of which structures are suitably supported on a supporting plate 9. The circuit interrupter 5 is of the type known in the art as a molded-case type circuit breaker since it comprises an insulating housing 11 of molded insulating material and an external handle 13 manually movable between two operating positions to open and close the contacts within the housing 11. As is shown schematically in FIG. 5, the handle 13 is moved about a pivot 15 to move a spring 17 overcenter to effect opening and closing of the contacts 19, 21 in a well known manner. When the contacts 19, 21 are in the closed position and an overload current passes through the coil 23, a plunger 25 of a solenoid 27 is moved to pivot a latch member 29 to unlatch the arm 31 of the movable contact 21 whereupon a spring 33 operates to open the contacts 19, 21. The contact 21 is stopped in the open position by means of a stop 32. The circuit breaker is reset by moving the handle 13 to the "off" position to relatch the lever 29 with the contact arm 31. The circuit breaker is trip-free in that if the handle 11 is held in the closed position the circuit breaker will still be tripped open upon the occurrence of an overload current through the breaker. Stop means 35 are provided to limit movement of the handle in both directions. The circuit breaker 5 is of the type shown in the patent to G. G. Grissinger et al., Patent No. 2,586,326. Since the circuit breaker is fully described in the above-mentioned patent, only a schematic drawing and a brief description of the mechanism is given herein.

The center line of the throw of the handle 13 of the circuit breaker 5 is shown in dash and dot lines at 41 in FIG. 1. This is the line over which the handle 13 of the circuit breaker 5 passes to move the spring 17 overcenter to effect operation of the circuit breaker. The significance of this line will be hereinafter specifically set forth.

The circuit breaker 5 is operated by means of the motor operating mechanism 7. The motor operating mechanism 7 comprises a reversible motor 43 operating through an output shaft 45 (FIG. 4) to drive a gear apparatus 47 to rotate a main shaft 49. The main shaft 49 is rotatable about an axis 51 (FIGS. 2 and 3). A connecting structure indicated generally at 53 comprises two arm portions 55 (FIG. 3) and 57 (FIG. 2) both of which are mounted on the shaft 49 to rotate relative to the shaft 49. A generally U-shaped rod 59 (FIG. 1) passes through suitable openings in the arm portion 55 and has its free ends secured in the arm portion 57. The U-shaped member 59 straddles the operating handle 13 (FIG. 1) of the circuit breaker 5.

Referring to FIG. 3, it will be seen that the arm portion 55 of the connecting structure 53 has an opening therein in which a compression spring 61 is positioned. The upper part of the spring 61 engages an adjusting nut 63 that is threaded in a tapped portion of the arm 55. The lower end of the spring 61 engages a spring seat 65 that is movably supported in the opening in the arm portion 55. The spring 61 is held under compression between the nut 63 and spring seat 65. The spring seat 65 has a socket therein that receives a semi-spheroidal shaped member 67 that is formed integral with a support 69. This ball-and-socket or universal type connection permits the member 69 to swivel relative to the spring seat 65. A friction shoe member 71 having an annular shaped friction surface 73 thereon is secured in a suitable opening in the support 69.

The connecting structure 53 is driven by means of a rotatable friction member 75 having a friction surface 77 at its periphery. The friction member 75 is rigidly secured to the shaft 49 to rotate with the shaft 49. As can be seen in FIG. 3, the periphery of the friction member 75 is generally circular in cross section and the number 75 is mounted on the shaft 49 eccentric with respect to the shaft. The center point or axis of the shaft 49 is shown at 51 and the center point of the periphery of the member 75 is shown at 79.

As is best seen in FIG. 2, a cam member 81, having a periphery or cam surface comprising a semi-circular part 83 and a flat part 85, is rigidly secured to the operating shaft 49 to rotate with the shaft 49 and operate a plunger 87 of a reversible switch indicated generally at 89. The plunger 87 is biased into engagement with the cam surface 83, 85. The switch 89 has two sets of reversible contacts therein for a purpose to be hereinafter described.

Referring to FIG. 4, when the circuit interrupting apparatus 3 is mounted and wired for operation, two lines L1 and L2 are connected to a suitable power source. A switch indicated generally at 91 is connected to operate the apparatus. As is seen in FIGS. 1–5, the circuit breaker 5 is in the "off" or open position. In order to close the circuit breaker, the switch arm 93 (FIG. 4) is moved into engagement with a contact 95 to close a circuit from L1 through the switch arm 93, contact 95, a line L3, a pair of closed contacts 97 of the switch 89, a line L4, a motor coil C1, through the line L2. This energizes the reversible motor to rotate the output shaft 45 in a direction that will rotate the main shaft 49 in a clockwise (FIGS. 2 and 3) direction. Clockwise rotation of the shaft 49 about the pivot 51 (FIGS. 2 and 3) rotates the friction driving member 75 clockwise. As is seen in FIG. 3, the center point 79 of the friction drive member 75 is below the center 51 or axis of the shaft 49, so that the point X on the periphery or friction surface 77 is the point having the shortest dimension from the axis 51 and the point Y on the periphery or friction surface 77 is the point having the greatest dimension from the axis 51. Thus, when the eccentrically mounted driving friction member 75 is rotated clockwise (FIG. 3) by rotation of the shaft 49, the friction surface 77 initially slides against the surface 73 and the friction shoe 71 and support 69 are moved up to additionally charge the compression spring 61 increasing the force that biases the friction surface 73 against the friction surface 77. It is well known that the friction between two surfaces is proportional to the force pressing the surfaces together. During this rotation, therefore, the force of the spring 61 pressing the surfaces 73, 77 together will increase the friction until the surfaces 73, 77 grab, whereupon further rotation of the driving friction member 75 will move the driven friction shoe 71 and, therefore, the driven structure 53 and handle 13 (FIG. 1) clockwise about the shaft 49. When the handle 13 moves over the center line 41 (FIG. 1), the over center spring 17 (FIG. 5) will move over center whereupon the spring operates to close the contacts of the circuit breaker with a snap action. Although the mechanism is shown in FIG. 5 schematically such that when the spring 17 snaps over center it moves the handle 13 rapidly therewith to the extreme position, the circuit breaker 5 which is of the type shown in Patent No. 2,586,326 is constructed such that when the over center spring is moved over center the mechanism will be moved to the operating position with a snap action independent of the movement of the handle 13 in a manner well-known in the art. Thus, though the handle 13 is moved at the speed of the rotating output shaft 45, the mechanism within the circuit breaker will be rapidly moved to the open or closed position when the over center spring within the mechanism moves over the center line 41 of the throw of the handle 13. When the handle 13 reaches its extreme operating position and is stopped by, for example, the stop means 35 (FIG. 5), the friction surfaces will break-away and the driving friction member 75 will slip against the friction surface 73 moving relative to the member 71 and connecting structure 53 until it is stopped in a manner to be hereinafter described. This slipping action prevents the application of a damaging force to the handle 13 and internal mechanism of the circuit breaker during operation.

As was previously described, the closing circuit passes through the contacts 97 of the switch 89. This circuit is automatically opened when the flat portion 85 (FIG. 2), of the cam member 81, passes the plunger 87 of the switch 89 to open the contacts 97. This movement of the cam member 81 simultaneously closes a pair of contacts 99 (FIG. 4) to prepare an opening circuit. After the closing circuit has been opened by opening of the contacts 97, the driving friction member 75 and cam 81 will be rotated by the shaft 49 until the inertia of the motor 43 and gears 47 has been spent. The breaking action of the motor 43, gears 47 and engaging friction surfaces 73, 77 is such that the shaft 49 and driving friction member 75 will be stopped at a position wherein the periphery or friction surface 77 again engages the friction surface 73 at or near the low point X on the driving friction member 75.

Thereafter, when it is desired to move the handle 13 to turn the circuit breaker "off," the switch 93 (FIG. 4) is moved out of engagement with the contact 95 and back into engagement with a contact 101. This closes a circuit from L1 through the switch arm 93, the contact 101, the line L5, the contacts 99 which were closed by the previous operation, a line L6, a motor coil C2 to the line L2. Energization of the motor coil C2 operates to rotate the output shaft 45 of the reversible motor 43 in the opposite direction to thereby rotate the main shaft 49 in the opposite or counterclockwise (FIGS. 2 and 3) direction. During this movement, the driving friction member 75 is rotated counterclockwise to initially slide or slip relative to the friction surface 73 and to move the friction shoe 71 and support 69 up to compress the spring 61 and increase the force biasing the friction surfaces 73, 77 together. During this movement, the force of the spring 61 increases to increase the friction between the surfaces 73, 77 until the surfaces 73, 77 grab and thereafter the driven connecting structure 53 is rotated counterclockwise unitarily with the driving member 75 to move the handle 13 back to the "off" position. During this movement, when the handle 13 passes over the center line 41 (FIG. 1), to move the operating spring of the circuit breaker over the center line, the spring operates to open the contacts of the circuit breaker with a snap action. During this operation, the flat portion 85 (FIG. 2) of the cam member 81 again passes the plunger 87 of the switch 89 to open the contacts 99 (FIG. 4) breaking the opening circuit and to simultaneously close the contacts 97 preparing the closing circuit for another operation. When the handle 13 reaches the full "off" position, the handle is stopped by stop means 35 (FIG. 2) and the friction surfaces 73, 77 break-away whereupon the driving friction member 75 rotates with the shaft 49 slipping against the stopped friction member 77 to thereby prevent the application of a damaging force to the handle 13 and internal parts of the circuit breaker. The main shaft 49, and the driving friction member 75 and cam 81 which are attached to the main shaft 49 will be rotated until the inertia of the motor 43 and gears 47 is spent. The braking action of the motor 43, gears 47 and engaging friction surfaces 73, 77 is such that the parts will be stopped at about the position seen in FIGS. 1–3, and a closing operation of the circuit breaker 5 can again be effected in the same manner hereinbefore described.

As can be seen in FIG. 3, the driving member 75 is stopped in a position wherein the low point X on the periphery or friction surface 77 engages the center of the annular shaped friction surface 73 so that the spring 61 is expanded to its maximum adjusted position after each operation. This stopped position of the driving friction member 75 can vary to some extent in either direction so long as it is stopped in a position wherein the spring 51 is relatively expanded. As the spring 61 expands the force biasing the surface 73 toward the surface 77 decreases and, therefore, the friction between these surfaces is decreased. Since, when the parts are stopped after each motor operation, there is relatively less friction between the surfaces 73, 77, the circuit interrupting apparatus is more easily manually operated.

In order to manually operate the circuit breaker 5, a screwdriver 107, rod, or other suitable tool is inserted into an opening 105 (FIG. 1) in the arm 55, and the driven connecting structure 53 is manually rotated about the shaft 49 to manually move the handle 13 from one to the other operating position. During this movement, the friction surface 73 slides or slips against the friction surface 77 of the driving friction member 75. Since there is relatively less friction between the surfaces 73, 77 because of the relatively expanded condition of the spring 61, it is easier to manually operate the circuit breaker, which manual operation is affected without an operation disconnecting the driven structure 53 from the driving friction member 75.

If the circuit breaker is manually operated from a first position to a second position and then manually operated back to the first position, the circuit breaker could thereafter be operated by means of the motor operating mechanism 7 in the same manner hereinbefore described. If, however, the circuit breaker 5 is manually operated from a first to a second position and if it is not thereafter manually operated back to the first position, it will require two operations of the motor operating mechanism 7 in order to effectively operate the circuit breaker. For example, the structure is shown in FIGS. 1–5 with the circuit breaker in the "off" position. If a screwdriver 107 is placed in the opening 105 and the connecting structure 53 is manually moved to move the handle 13 from the "off" position to the "on" position to close the circuit breaker, the driven structure 53 will move relative to the shaft 49, driving member 75, and cam member 81. With the circuit breaker 5 in this manually operated "on" position, since the motor operating mechanism has not been operated, the cam member 81 has not been operated to close the contacts 99 to prepare the opening circuit, and the switch arm 93 is still in engagement with the contact 101. Thus, in order to operate the circuit breaker back to the "off" position by means of the motor operating mechanism the switch 93 must first be moved into engagement with the switch 95 to operate the motor and drive the member 75, and cam 81 in a manner that would have operated the circuit breaker handle 13 to the "on" position. These parts will move relative to the connecting driven structure 53 and handle 13 which structures are already in the "on" position. This operation, therefore, will just move the motor driving parts of the motor operating mechanism to the "on" position and the cam member 81 will operate the switch 89 opening the contacts 97 and closing the contacts 99 to prepare the closing circuit. Thereafter, the switch arm 93 can be moved back into engagement with the contact 101 to thereby move the operating handle 13 from the "on" position to the "off" position in the same manner hereinbefore described.

As was hereinbefore set forth, the circuit breaker is trip-free in that the circuit breaker will trip open upon the occurrence of an overload current above a predetermined value even though the handle 13 is held in the "on" position. The circuit breaker is reset after an automatic tripping operation by moving the handle 13 to the extreme "off" position to relatch and reset the mechanism within the circuit breaker. Thus, after a tripping operation, the motor mechanism 7 is operated to move the handle 13 to the extreme "off" position in the same manner hereinbefore described to reset the breaker. Thereafter, the handle 13 can be moved to operate the circuit breaker in the same manner hereinbefore described.

The motor operating mechanism 7 can readily be adapted to different types of circuit interrupters. For example, various sizes and ratings of circuit breakers of the molded-case type seen in FIG. 1 can be operated by means of the motor operating mechanism. Since the force necessary to effectively operate the operating handle 13 can vary as between circuit breakers and especially as between circuit breakers having different ratings, means are provided to adjust the force biasing the friction surfaces 73, 77 together to thereby adjust the operating characteristics of the motor operating mechanism 7. Referring to FIGS. 1 and 3, the nut 63, which is in threaded engagement in the opening in the arm 55, can be rotated to move down or up to either increase or decrease the initial compression of the spring 61 to thereby increase or decrease the amount of force biasing the friction surfaces 73 against the friction surface 77. Thus, the friction between the surfaces 73, 77 can be adjusted to provide for positive action of the circuit interrupting apparatus when any one of a variety of different circuit interrupters are used in the combination.

The motor operating mechanism 7 has been illustrated and described in combination with a molded-case type circuit breaker having an external operating handle 13. The mechanism has an additional advantage when used in this combination because it can be readily connected to the circuit breaker handle, and because when it is mounted beside the circuit breaker for operation the motor operating mechanism is not substantially higher than the circuit breaker. Thus, the combination can readily fit within a standard panel board or enclosure without requiring any significant reconstruction of the panel board or enclosure. It is to be understood, however, that the motor operating mechanism can also be advantageously used in combination with many other types of circuit breakers and switches and also with various other forms of circuit interrupters.

While the invention has been disclosed in accordance with the provisions of the patent statutes, it is to be understood that various changes in the structure or details thereof may be made without departing from the spirit and scope of the invention. It is desired, therefore, that the language of the appended claims be given the broadest reasonable construction permissible in the light of the prior art.

I claim as my invention:

1. A mechanism for operating a circuit interrupter having an operating member movable between a first and a second position, said mechanism comprising a driven structure adapted to be operatively connected to said operating member, a motor, a shaft rotatable by operation of said motor, said driven structure being rotatably mounted on said shaft annd having a driven friction surface thereon, a driving friction member secured to said shaft and having a driving friction surface thereon, resilient means mounted on said driven structure and applying a force to bias said drive friction surface into engagement with said driving friction surface, said driving friction member being so constructed and so secured to said shaft that upon rotation of said shaft said engaging friction surfaces are moved to compress said resilient means and increase said force whereupon said friction surfaces grab and said driving friction member moves said driven structure to thereby move said operating member from said first to said second position, means stopping said operating member and said driven structure when said operating member reaches said second position, said shaft and driving friction member moving to a stopped condition after said operating member and driven structure have been stopped, and said driving friction member being so constructed and so secured to said shaft that during said stopping movement thereof said engaging friction surfaces are moved to permit said resilient means to expand and decrease said force.

2. A mechanism for operating a circuit interrupter having an operating member movable between a first and a second position, said mechanism comprising a driven structure adapted to be operatively connected to said operating member, a motor, a shaft rotatable by operation of said motor, said driven structure being rotatably mounted on said shaft and having an annular shaped driven friction surface thereon, a driving member having a periphery that is generally circular in cross section and being secured eccentrically on said shaft, resilient means supported on said driven structure and applying a force to bias said driven friction surface into engagement with said periphery, upon rotation of said shaft said periphery initially sliding with respect to said driven friction surface and moving to compress said resilient means and increase said force whereupon the frictional engagement between said periphery and said driven friction surface is increased to such a degree that said driving member moves said driven structure unitarily therewith to thereby move said operating member from said first to said second position, means stopping said operating member and said driven structure when said operating member reaches said second position, said driving member moving for a time after said operating member and driven structure have been stopped during which time said periphery moves to permit said resilient means to expand and decrease said force.

3. A mechanism for operating a circuit breaker having an operating member movable between a first and a second position, said mechanism comprising a driven structure adapted to be operatively connected to said operating member, a motor, a shaft rotatable by operation of said motor, said driven structure being rotatably mounted on said shaft and having an annular shaped driven friction surface thereon, a driving friction member having a periphery that is generally circular in cross section and being secured eccentrically on said shaft, a compression spring supported on said driven structure and applying a force to bias said driven friction surface into engagement with said periphery, means operable to adjust said compression spring to adjust the amount of said force, upon rotation of said shaft and said driving member said periphery initially sliding with respect to said driven friction surface and moving to compress said spring and increase said force to increase the friction between said periphery and said driven friction surface whereupon said periphery and said driven friction surface grab and said driving member moves said driven structure unitarily therewith to thereby move said operating member from said first to said second position, means stopping said operating member and said driven structure in said second position, said shaft and said driving member moving to a stopped condition after said operating member and said driven structure have been stopped, and during said stopping movement of said driving member said periphery moving to permit said spring to expand and decrease said force to thereby reduce the friction between said periphery and said driven friction surface.

4. A mechanism for operating a circuit breaker having an operating member movable between a first and a second position, said mechanism comprising a connecting structure adapted to be operatively connected to said operating member, a motor having an output shaft, drive means comprising a first friction member operatively connected to said connecting structure and a second friction member operatively connected to said output shaft, means applying a force to bias at least one of said friction members toward the other of said friction members, means operable upon energization of said motor and rotation of said output shaft to rotate said second friction member, said second friction member upon initial rotation thereof slipping against said first friction member, upon further rotation of said second friction member means operating automatically to increase said force to increase the friction between said friction members whereupon said friction members grab and said first friction member is moved with said second friction member to move said connecting structure to thereby move said operating member from said first to said second position, means operating automatically to deenergize said motor when said operating member has been operatively moved, means stopping said first friction member said connecting structure and said operating member when said operating member reaches said second position, said second friction member and said shaft moving to a stopped condition after said operating member reaches said second position during which stopping movement said second friction member slips against said stopped first friction member, means operating automatically to decrease said force during said stopping movement of said shaft and said second friction member to thereby decrease the friction between said friction members, means stopping said shaft and said second friction member at a position where said friction is reduced, and means for manually moving said connecting structure to move said operating member from said second position to said first position during which manual movement said first friction member slips against said stopped second friction member.

5. A mechanism for operating a circuit breaker having an operating member movable between a first and a second position, said mechanism comprising a driven structure adapted to be operatively connected to said operating member, a motor, a shaft rotatable by operation of said motor, said driven structure being rotatably mounted on said shaft and having an annular shaped driven friction surface thereon, a driving friction member having a periphery that is generally circular in cross section and being secured eccentrically on said shaft, said periphery comprising a driving friction surface, a compression spring supported on said driven structure and applying a force to bias said driven friction surface into engagement with said driving friction surface, upon energization of said motor and rotation of said shaft said driving friction surface initially sliding against said driven friction surface and moving to compress said spring and increase said force whereupon said friction surfaces grab and said driving member moves said driven structure unitarily therewith to thereby move said operating member from said first to said second position, means stopping said operating member and said driven structure when said operating member reaches said second position, means automatically deenergizing said motor whereupon said driving member moves to a stopped condition after said operating member reaches said second position, during said stopping movement of said driving friction member said driving friction surface moving to permit said spring to expand reducing said force, means stopping said driving friction member in a position wherein said force is reduced, and means for manually moving said driven structure to move said operating member from said second to said first position during which movement said driving friction surface slides against said stopped driven friction surface.

6. In combination, a circuit breaker having a pair of cooperating contacts and an operating member movable between two operating positions to open and close said contacts, a mechanism for operating said circuit breaker and comprising a friction clutch, said friction clutch comprising a driving friction member and a driven friction member, means operatively connecting said driven friction member to said operating member, means exerting a force to bias at least one of said friction members toward the other, upon operative movement of said driving friction members means operating automatically to increase said force whereupon said friction members grab and said driving friction member moves said driven friction member unitarily therewith to effect movement of said operating member from one to the other of said operating positions, means stopping movement of said operating member and said driven friction member when said operating member has reached said other operating position, means moving said driving friction member to a stopped condition after said operating member and driven friction member have been stopped, means operating to automatically decrease said force during said stopping movement of said driving friction member, manually operable means manually operable when said operating member, said driven friction member and said driving friction member have been stopped, said manually operable means being operable to operate said driven friction member to move said operating member from said other to said one position during which movement said driving friction member remains stopped and said clutch slips.

7. In combination, a circuit breaker having a pair of cooperating contacts and an operating member movable between two operating positions to open and close said contacts, a motor operating mechanism for operating said circuit breaker, said mechanism comprising a connecting structure operatively connected to said operating member, a motor having an output shaft, drive means comprising a first friction member operatively connected to said connecting structure and a second friction member operatively connected to said output shaft, means applying a force to bias at least one of said friction members toward the other of said friction members, means operable upon energization of said motor and rotation of said output shaft to rotate said second friction member, said second friction member upon initial rotation thereof slipping against said first friction member, upon further rotation of said second friction member means operating to increase said force whereupon said friction members grab and said first friction member is moved with said second friction member to move said connecting structure to thereby move said operating member from said first to said second position, means stopping movement of said operating member said connecting structure and said first friction member when said operating member has reached said second position, means automatically deenergizing said motor, means moving said second friction member to a stopped condition when said motor has been deenergized and after said operating member has reached second position, means operating to decrease said force during said stopping movement of said second friction member, means stopping said second friction member in a position where said force is reduced, and means for manually moving said connecting structure to move said operating member from said second position to said first position during which movement said first friction member slips against said stopped second friction member.

8. In combination, a circuit breaker comprising a molded housing having cooperating contacts therein, an operating handle extending from said housing and being movable between two operating positions to open and close said contacts, a motor operating mechanism mounted adjacent said circuit breaker and comprising a motor, a shaft rotatable upon energization of said motor, a driven structure operatively connected to said operating member, said driven structure being rotatably mounted on said shaft and having a driven friction surface thereon, a driving friction member having a driving friction surface thereon and being secured to said shaft, resilient means mounted on said driven structure and applying a force to bias said driven friction surface into engagement with said driving friction surface, said driving friction member being so constructed and so secured to said shaft that upon energization of said motor and rotation of said shaft said driving friction surface moves to compress said resilient means and increase said force whereupon said friction surfaces grab and said driving friction member moves said driven friction member unitarily therewith to thereby move said operating handle from one to the other of said positions, means stopping said operating handle and said connecting structure at said other position, said driving friction member being so constructed and so secured to said shaft that when said operating handle is operatively moved and said connecting structure has been stopped said driving friction surface moves to permit said resilient means to expand and decrease said force, means automatically deenergizing said motor, said shaft and said driving friction member moving to a stopped condition after said motor has been deenergized and after said operating handle and connecting structure have been stopped, said driving friction member being so constructed and so secured to said shaft that during said stopping movement thereof said driving friction surface moves to permit said resilient means to expand and reduce said force, said motor operating mechanism being constructed in such a manner that said driving friction member will stop at a position wherein said force is reduced, and means for manually moving said connecting structure to move said operating handle from said other to said one position during which movement said reduced force permits said driving friction surface to slide relatively easily against said stopped driven friction surface.

9. In combination, a circuit breaker having a pair of cooperating contacts and an operating member movable between two operating positions to open and close said contacts, a motor operating mechanism for operating said circuit breaker, said motor operating mechanism comprising a reversible motor and a variable-friction drive means, said variable-friction drive means comprising a driving friction member operatively connected to said reversible motor and a driven friction member, means operatively connecting said driven friction member with said operating member, means exerting a force to bias at least one of said friction members toward the other, upon successive energizing operations of said motor said variable-friction drive means being operated first in one direction upon the occurrence of a first energizing operation to move said operating member from a first operating position to a second operating position and then in the other direction upon the occurrence of a second energizing operation to operate said operating member from said second operating position to said first operating position, during each of said energizing operations means operating automatically to increase said biasing force whereupon said friction members grab and said driving friction member moves said driven friction member unitarily therewith to effect movement of said operating member to the actuated position, during each of said successive energizing operations means stopping movement of said operating member and said driven friction member when said operating member has reached the actuated position, during each of said successive energizing operations means moving said driving friction member to a stopped condition after said operating member and driven friction member have been stopped with said operating member in the actuated position, and during each of said successive energizing operations means operating to automatically decrease said biasing force during said stopping movement of said driving friction member.

10. In combination, a circuit breaker having a pair of cooperating contacts and an operating member movable getween two operating positions to open and close said contacts, a motor operating mechanism for operating said circuit breaker, said motor operating mechanism comprising a reversible motor and a variable-friction drive means, said variable-friction drive means comprising a driving friction member operatively connected to said reversible motor and a driven friction member, means operatively connecting said driven friction member with said operating member, means exerting a force to bias at least one of said friction members toward the other, upon successive energizing operations of said motor said variable-friction drive means being operated first in one direction upon the occurrence of a first energizing operation to move said operating member from a first operating position to a second operating position and then in the other direction upon the occurrence of a second energizing operation to operate said operating member from said second operating position to said first operating position, during each of said energizing operations means operating automatically to increase said biasing force whereupon said friction members grab and said driving friction member moves said driven friction member unitarily therewith to effect movement of said operating member to the actuated position, during each of said successive energizing operations means stopping movement of said operating member and said driven friction member when said operating member has reached the actuated position, during each of said successive energizing operations means moving said driving friction member to a stopped condition after said operating member and driven friction member have been stopped with said operating member in the actuated position, during each of said successive energizing operations means operating to automatically decrease said biasing force during said stopping movement of said driving friction member, manually operable means manually operable when said operating member said driven friction member and said driving friction member have been stopped, said manually operable means being operable to operate said driven friction member to move said operating member from the actuated position to the other position during which movement said driving friction member remains stopped and said driven friction member slips relative to said driving friction member.

References Cited by the Examiner

UNITED STATES PATENTS

| | | | |
|---|---|---|---|
| 740,547 | 10/03 | Fiske | 200—153 |
| 2,068,402 | 1/37 | Duffing et al. | 200—92 |
| 2,175,897 | 10/39 | Johnson | 200—92 |
| 2,228,466 | 1/41 | Ludwig et al. | 200—92 |
| 2,732,443 | 1/56 | Roth | 200—92 X |
| 2,872,545 | 2/59 | Hobbs | 200—92 |

BERNARD A. GILHEANY, *Primary Examiner.*

ROBERT K. SCHAEFER, *Examiner.*